(12) United States Patent
Chiba et al.

(10) Patent No.: US 7,837,924 B2
(45) Date of Patent: Nov. 23, 2010

(54) METHOD FOR MANUFACTURING FRICTION MATERIAL OR FRICTION MATERIAL PRODUCTS

(75) Inventors: Masanori Chiba, Oura-gun (JP); Yasuji Ishii, Oura-gun (JP); Hiroshi Mimura, Oura-gun (JP)

(73) Assignee: Nisshinbo Holdings, Inc., Tokyo (JP)

( * ) Notice: Subject to any disclaimer, the term of this patent is extended or adjusted under 35 U.S.C. 154(b) by 503 days.

(21) Appl. No.: 11/421,423

(22) Filed: May 31, 2006

(65) Prior Publication Data

US 2006/0272762 A1    Dec. 7, 2006

(30) Foreign Application Priority Data

Jun. 2, 2005    (JP) .............................. 2005-162119

(51) Int. Cl.
*B29C 35/02* (2006.01)
*B29C 43/02* (2006.01)

(52) U.S. Cl. .................. 264/347; 264/236; 264/319

(58) Field of Classification Search ................. 425/812; 264/236, 319, 347
See application file for complete search history.

(56) References Cited

U.S. PATENT DOCUMENTS 3,998,573 A * 12/1976 Gilbert et al. ............... 425/117
4,714,420 A * 12/1987 Milisavljevic ............... 425/161
4,874,564 A * 10/1989 Sudani et al. ............... 264/29.7
5,073,099 A * 12/1991 Kayano ....................... 425/125
5,531,943 A * 7/1996 Sudani et al. ............... 264/29.1
5,888,645 A * 3/1999 Lindgaard et al. .......... 428/324

FOREIGN PATENT DOCUMENTS

| EP | 1063443 | * 12/2000 |
| JP | 62-021528 | 1/1987 |
| JP | 07-167173 | * 7/1995 |
| JP | 10-204187 | 8/1998 |

* cited by examiner

*Primary Examiner*—Joseph S Del Sole
*Assistant Examiner*—Robert Dye
(74) *Attorney, Agent, or Firm*—Apex Juris-pllc; Tracy M Heims

(57) ABSTRACT

To provide the method for manufacturing the friction material for shortening the heat treatment process for completely curing the thermosetting resin in the friction material. The method includes the molding process for fixing the friction material onto a back plate, in which a raw material including a thermosetting resin is superposed onto the back plate, pressed and heated in the mold, and the heat treatment process for curing the friction material, using a pair of heat plates provided at the back plate side and the friction material side to press the back plate surface and the friction material, and the heat plate temperature at the friction material side is between 300 and 650° C., at the back plate side is between 180 and 350° C., and the heat treatment time is between 2 and 70 minutes.

13 Claims, 8 Drawing Sheets

FIG. 7

| | | Embodiment | | | | | | | | | | | | | | | | | | | | | |
|---|---|---|---|---|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
| Temperature of heat plate (°C) | Friction surface side | 300 | 330 | 330 | 330 | 380 | 380 | 380 | 420 | 420 | 420 | 420 | 420 | 420 | 420 | 470 | 470 | 470 | 520 | 520 | 520 | 650 | 420 | ※ |
| | Back plate side | 180 | 180 | 200 | 200 | 200 | 220 | 220 | 230 | 230 | 230 | 230 | 230 | 230 | 230 | 250 | 250 | 300 | 300 | 300 | 350 | 350 | 230 | condition1 |
| Time (min) | | 70 | 50 | 60 | 50 | 15 | 16 | 15 | 6 | 6 | 6 | 6 | 6 | 6 | 6 | 3 | 4 | 4 | 2 | 3 | 3 | 2 | 10 | 6 |
| Pressure (MPa) | | 1.5 | 1.5 | 1.5 | 1.5 | 1.5 | 1.5 | 1.5 | 0.1 | 0.1 | 0.2 | 0.25 | 1.5 | 3 | 15 | 1.5 | 1.5 | 1.5 | 1.5 | 1.5 | 1.5 | 1.5 | 1.5 | 1.5 |
| Grooves/slots in heat plate | | A | A | A | A | A | A | A | A | A | A | A | A | A | A | A | A | A | A | A | A | A | P | A |
| Atmosphere temp. of heat treatment furnace | | – | – | – | – | – | – | – | – | – | – | – | – | – | – | – | – | – | – | – | – | – | – | – |
| Product external appearance | | ○ | ○ | ○ | ○ | ○ | ○ | ○ | ○ | ○ | ○ | ○ | ○ | ○ | ○ | ○ | ○ | ○ | ○ | ○ | ○ | ○ | ○ | ○ |
| Abrasion resistance | | △ | ○ | △ | ○ | ○ | ○ | ○ | △ | ○ | ○ | ○ | ○ | ○ | ○ | ○ | ◎ | ◎ | △ | △ | ○ | △ | ◎ | ◎ |
| Shear strength | | △ | △ | ○ | ○ | ○ | ○ | ○ | ◎ | ◎ | ○ | ◎ | ◎ | ◎ | ◎ | ◎ | ◎ | ○ | △ | ○ | △ | △ | ◎ | ◎ |
| Dimensional precision | | ◎ | ◎ | ◎ | ◎ | ◎ | ◎ | ◎ | ◎ | ◎ | ○ | ◎ | ◎ | ◎ | ◎ | ◎ | ◎ | ◎ | ◎ | ◎ | ◎ | ◎ | ◎ | ◎ |
| Initial fade performance | | △ | ○ | ◎ | ○ | ◎ | ◎ | ◎ | ◎ | ○ | ○ | ◎ | ◎ | ◎ | ◎ | ◎ | ◎ | ◎ | ◎ | ◎ | ◎ | ◎ | ◎ | ◎ |

A = ABSENT    P = PRESENT

※ Condition

First heat plate pair   Friction surface side 200°C   Back plate side 130°C   Time 1min
Second heat plate pair  Friction surface side 280°C   Back plate side 150°C   Time 1min
Third heat plate pair   Friction surface side 370°C   Back plate side 200°C   Time 1min
Fourth heat plate pair  Friction surface side 470°C   Back plate side 250°C   Time 1min
Fifth heat plate pair   Friction surface side 470°C   Back plate side 250°C   Time 1min
Sixth heat plate pair   Friction surface side 470°C   Back plate side 250°C   Time 1min

FIG. 8

| | | Comparative Example | | | | | | | | | | | | | | | |
|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 |
| Temperature of (°C) | Friction surface side | 280 | 280 | 280 | 300 | 300 | 300 | 420 | 420 | 650 | 650 | 650 | 670 | 670 | 670 | — | — |
| | Back plate side | 180 | 180 | 230 | 200 | 170 | 170 | 170 | 360 | 350 | 360 | 360 | 230 | 350 | 350 | — | — |
| Time (min) | | 70 | 120 | 120 | 80 | 70 | 80 | 10 | 10 | 1 | 2 | 1 | 2 | 2 | 1 | 150 | 80 |
| Pressure (MPa) | | 1.5 | 1.5 | 1.5 | 1.5 | 1.5 | 1.5 | 1.5 | 1.5 | 1.5 | 1.5 | 1.5 | 1.5 | 1.5 | 1.5 | — | — |
| Groove/slots in heat plate | | A | A | A | A | A | A | A | A | A | A | A | A | A | A | A | A |
| Atmosphere temp. of heat treatment furnace | | — | — | — | — | — | — | — | — | — | — | — | — | — | — | 300 | 420 |
| Product external appearance | | O | O | O | O | O | O | O | O | △ | △ | △ | × | × | × | ◎ | O |
| Abrasion resistance | | × | × | ◎ | × | △ | × | ◎ | ◎ | × | △ | × | △ | △ | △ | ◎ | × |
| Shear strength | | △ | △ | ◎ | △ | × | △ | × | × | △ | × | △ | ◎ | △ | △ | ◎ | ◎ |
| Dimensional precision | | ◎ | ◎ | ◎ | ◎ | ◎ | ◎ | ◎ | ◎ | ◎ | ◎ | ◎ | ◎ | ◎ | ◎ | ◎ | ◎ |
| Initial fade performance | | × | × | × | △ | △ | △ | ◎ | ◎ | ◎ | ◎ | ◎ | ◎ | ◎ | ◎ | × | ◎ |

A = ABSENT

METHOD FOR MANUFACTURING FRICTION MATERIAL OR FRICTION MATERIAL PRODUCTS

BACKGROUND OF THE INVENTION

1. Field of the Invention

This invention relates to a method for manufacturing a friction material and in particular, relates to a method for shortening the curing time of a friction material including a thermosetting resin.

2. Description of the Related Art

Many of the friction materials, such as brake linings or clutch facings, are made into products by themselves; however, some friction materials are made into products such as disc pads by fixing the friction material to metallic plates called a back plate or brake shoes by fixing the friction material to metallic brake shoe bodies.

FIGS. 4A and 4B show a back plate of a conventional friction material product, where FIG. 4A is a plan view, and FIG. 4B is a cross sectional view of FIG. 4A taken along the line B-B. This friction material product is used in a disc pad of a disc brake. In the figure, the back plate 1 is made of a steel plate for automobile structural uses or a steel plate for machine structural uses, and is formed into a set shape by blanking, and at the same time, two binding holes 2, 2 are opened therein.

After the blanking process is performed by the pressing machine, oil on the surface of the back plate 1 is removed at a degreasing process, and the surface thereof is finished by sand blasting and the like, and a thermosetting adhesive is applied to the surface so as to increase a binding force between the back plate and the friction material.

A raw material for manufacturing the friction material is a mixture of a fiber material, a filling material, and a binding material, where organic fibers such as cellulose pulp and aramid and the like, metallic fibers such as chip shaped metallic pieces or steel wool and the like, and inorganic fibers such as rock wool and the like are employed as the fiber material. The filling material is for increasing the volume of the friction material or for adding lubricating characteristics of the friction material, thereby obtaining a stable friction characteristic, and for example, barium sulfate, calcium carbonate, graphite and the like are employed as the filing material. The binding material is for binding the fiber material and the filling material, and thermosetting resins such as phenolic resin, urea resin, benzoxazine resin and the like are employed. Raw material of the friction material is made into a friction material through the following processes.

Preliminarily Forming Process

A raw friction material for the friction material, to which each raw material has been mixed, is measured, and a predetermined amount thereof is supplied to a mold, is then pressed by a pressing machine, and is then formed into a preliminarily formed product. In the preliminarily forming, in principle, the preliminarily formed product is made only by pressing; however, in some cases, heating is performed up to a temperature at which the binding material does not react.

FIGS. 5A and 5B are figures of the preliminarily formed product, and FIG. 5A is a plan view thereof, and FIG. 5B is a front view thereof. The shape of the preliminarily formed product 3 is the same as that of a finished product; however, the density is rough, and the thickness T is roughly double the thickness of the finished product that is pressed and fixed to the back plate 1 and compressed to a specified density. Furthermore, in the preliminarily formed product 3, protrusions 4, 4 corresponding to the binding holes 2 are formed. The lower slope portions of the protrusions 4, 4 are wide, but the diameter d1 of the top is smaller than the diameter D1 of the binding hole 2, for easy insertion into the binding hole 2.

Molding Process

The preliminarily formed product 3 formed thus, is superposed onto the back plate 1 on another pressing machine, and is then pressed and heated so as to be fixed.

FIGS. 6A and 6B are figures showing a disc pad 10, that consists of the friction material 13 and the back plate 1, which are fixed by the above process, wherein FIG. 6A is a plan view, and FIG. 6B is a front view. The friction material 13 is adhered on the back plate 1 and bonded to the back plate 1 at the binding hole 2.

Meanwhile, there is a case where the friction material is formed without the process of making the preliminarily formed product. In this case, a powder adhesive layer raw material is placed on the back plate, and the powder raw material used for the friction material or a granulated/size-enlarged material made of the powder raw materials is laminated on the back plate, and then the pressure is applied by a pressing machine thereon to be heated to mold the friction material while the friction material is fixed to the back plate at the same time.

In the case of a type of the friction material which is not fixed to the back plate, there is a case where the friction material is formed via the preliminarily formed product, and a case where without a process of making the preliminarily formed product, the powder raw material or the granulated/size-enlarged material is supplied directly into the mold, pressed and heated to be molded.

Heat Treatment Process

The friction material, which is fixed to the back plate, is bound to the back plate; however, curing of the thermosetting resin included in the friction material is not completed. In the same manner, as in the case of the friction material alone, curing of the thermosetting resin is not completed. Therefore, normally, the friction material is placed in a heating furnace at between 200 and 300° C. ambient temperatures for a time of between 150 and 300 minutes and is then completely cured. This process is called a heat treatment process.

Painting Process

The friction material, after heat treatment completion, is sent to a painting process, wherein spray painting of liquid paint or electrostatic powder painting is performed. Electrostatic powder painting is a painting method, wherein electrostatic powder paint is applied via sprayed onto either the friction material or the friction material fixed on the back plate, which is heated at 200° C. and baked.

Grinding Process

With regard to the painted friction material, as the surface of the friction material is ground, the friction surface is formed, a slit is made in friction surface, and beveled surfaces (chamfers) are formed on both the sides of friction surface.

Heat-Sear (Scorching) Process

In a heat-sear process, the surface of friction surface is seared by a high temperature around 380° C., to secure the braking effectiveness of the new product.

Inspection Process

Thereafter, it is inspected and shipped. Excluding the heat treatment process, the total time required for all of the above process is 1 to 2 minutes; however, the time for the heat treatment process is several hours, which is extremely longer than the other processes and as such, it is a bottleneck in the friction material manufacturing processes. Therefore, it hinders cost reduction.

As a method for shortening this time, there is proposed Patent Document 1 (Provisional Japanese Patent Publication No. 10-204187). Herein, a method is disclosed, wherein the friction material is pressed by a porous plate and heat treatment is performed in a heating furnace. Gas generated during resin curing is discharged outside via holes in the porous plate. As gas can be discharged easily, it is possible to prevent blisters or cracks from occurring in the friction material and therefore allows performing the heat treatment in a short period of time. However, this method uses conventional temperature, and still requires over 2 hour time.

Further, in Patent Document 2 (Provisional Japanese Patent Publication No. 62-21528), the heat treatment is performed in a non-oxidizing atmosphere at high ambient temperature between 350 and 1000° C. By utilizing high ambient temperature, resin curing is facilitated, and by utilizing the non-oxidizing atmosphere, it is possible to prevent the resin from deteriorating. Nitrogen gas is used for the non-oxidizing atmosphere. However, the volume of the heating furnace is large, and it therefore requires an enormous amount of nitrogen gas, which in turn greatly increases manufacture costs.

SUMMARY OF THE INVENTION

The present invention has been made in consideration of the above referenced problems with the prior art, and accordingly, the object of the present invention is to provide a method for manufacturing a friction material with a shortened the heat treatment process for completely curing a thermosetting resin in a friction material.

In order to achieve the above-objectives, the method for manufacturing the friction material of the present invention is characterized to comprise a molding process where a raw material for manufacturing the friction material including a thermosetting resin is pressed and heated in a mold, and a heat treatment process for curing the friction material, wherein the heat treatment process is designed to use a pair of heat plates to press both upper and lower surfaces of one friction material, while leaving a side surface around the friction material open, a temperature of the heat plate is between 300 and 650° C., and a heat treatment time is between 2 and 70 minutes, thereby maintaining a predetermined wear resistance without causing cracks and blisters in a finished product.

Also, the method for manufacturing the friction material product of the present invention is characterized to comprise a molding process for fixing one friction material onto a back plate, in which a raw material for manufacturing the friction material including a thermosetting resin is superposed onto a back plate, pressed and heated in a mold, and a heat treatment process for curing the friction material, wherein the heat treatment process is designed to use a pair of heat plates provided at the back plate side and the friction material side to press lower surface of the back plate and upper surface around the friction material open, and a temperature of the heat plate at the friction material side is between 300 and 650° C., a temperature of the heat plate at the back plate side is between 180 and 350° C., and a heat treatment time is between 2 and 70 minutes, thereby maintaining a predetermined wear resistance without causing cracks and blisters in a finished product.

Preferably, the temperature of the heat plate to be pressed onto the friction material are between 330 and 520° C., and the temperature of the heat plate onto the back plate is between 200 and 300° C. The preferable heat treatment time under this condition is 3 minutes to 50 minutes. There could be various structures, wherein the pressing force for pressing the heat plate may be 0.1 MPa or higher; grooves may be formed on the heat plate; one pair of the heat plates sandwich the friction material or this friction material fixed on the back plate, and plural pair of heat plates are arranged to cure the friction material as sending the friction material or the friction material fixed to back plate one after another; and plural pairs of heat plates have different temperatures, and when the friction material or the friction material fixed to back plate is sent one after another, the temperature is set to increase gradually, or a forming process, a heat treatment process, a painting process, and a grinding process may be performed continuously.

According to the present invention, the following operation is obtained. By superposing the preliminarily formed product to apply the pressure and to be heated, the preliminarily formed product is compressed to about ½ of the thickness thereof and fixed to the back plate. Alternatively, a powder or a granulated/size-enlarged powder tablet-like raw friction material is filled directly into mold and superposed with the back plate, and by applying pressing and heating, the friction material and the back plate are fixed.

The heat plate is pressed from both of the friction material side and the back plate side against the friction material and the back plate under this condition. In the case of the friction material alone, the heat plate is pressed from both the sides of friction material. The temperature of heat plate is set low because the back plate is metallic and thermal conductivity is high, and the friction material side is set high because thermal conductivity is low. As a result, the friction material is heated from both the sides at roughly the same temperature. Although the temperature may be the conventional heat treatment temperature, it is preferable to increase the temperature, which facilitates curing of the friction material. When it cures, a large amount of gas are generated from the friction material, and this gas can be discharged swiftly from the sides of the friction material to the outside, and therefore, it is not accumulated inside to swell or deform the friction material.

According to the method for manufacturing the friction material under the present invention, because the heat plate is employed, there is no need for the time to increase the ambient temperature such as a case to employ the heat treatment furnace. Furthermore, because the temperature of the heat plate is far higher than that of the conventional heat treatment temperature, curing of the thermosetting resin is facilitated, and it is possible to shorten the heat treatment time from the conventional 150 minutes or even down to several ten minutes to several minutes.

If the pressure at which the heat plate presses the friction material is 0.1 MPa or higher, it is possible to prevent the friction material from being deformed. By forming grooves in the heat plate, it is possible to make the gas discharge much quicker.

By performing the heat treatment by plural pairs of heat plate pairs, the heat treatment time per 1 heat plate pair can be shortened; therefore, it is possible to make continuous plural processes from molding of the friction material to grinding.

BRIEF DESCRIPTION OF THE DRAWINGS

The above and other objects of the present invention will become readily apparent by reference to the following detailed description when considered in conjunction with the accompanying drawings wherein:

FIGS. 4A and 4B are figures showing the conventional back plate of the disc pad, wherein FIG. 4A is a plan view, and FIG. 4B is a cross-section view of FIG. 4A taken along the line B-B;

FIGS. 5A and 5B are figures of the preliminarily formed product, wherein FIG. 5A is a plan view, and FIG. 5B is a front view;

FIG. 6 are figures showing the state wherein the friction material is fixed to the back plate, and FIG. 6A is a plan view while

FIG. 7 is a table showing data of a preferred embodiments of the present invention; and FIG. 8 is a table showing data of comparative examples of the present invention.

PREFERRED EMBODIMENTS OF THE INVENTION

Figure 1:
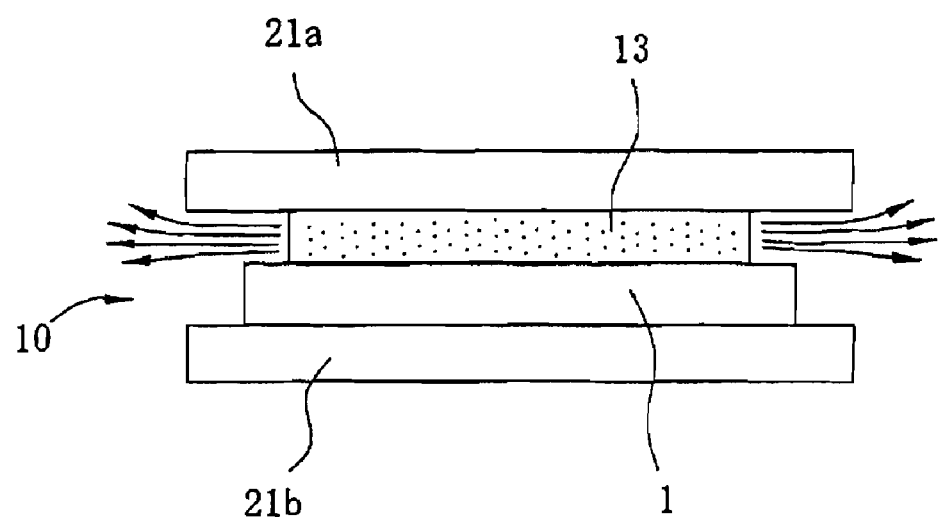
FIG. 1 is a figure showing the state of heat treatment of the present invention.
Figure 6A:
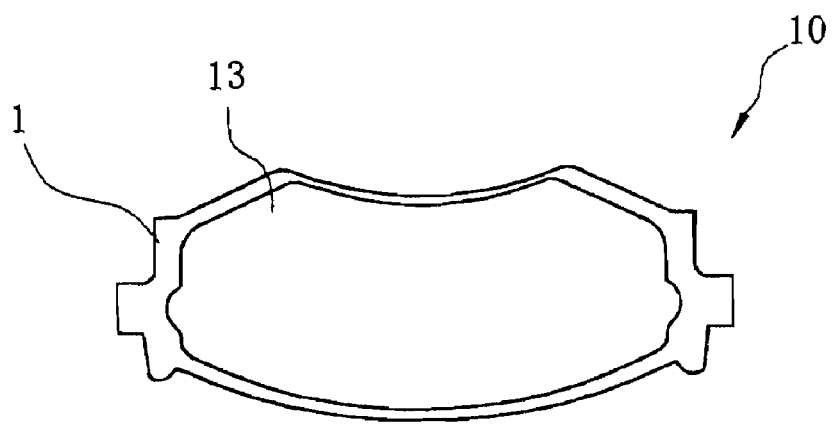
Figure 6B:
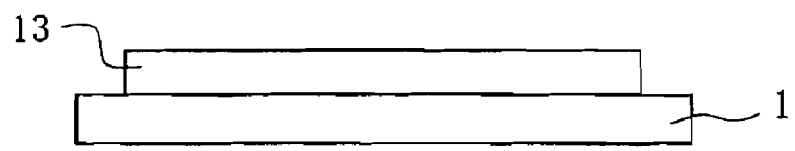
FIG. 6B is a front view.

Hereinafter, a preferred embodiment of the present invention will be explained with reference to the drawings. FIG. 1 is a figure showing the state of the heat treatment of the present invention. A disc pad 10 shown in the figure is the same as the disc pad shown in FIGS. 6A and 6B. A friction material 13 is compressed to a thickness thereof that is about ½ of the height T of a preliminarily formed product 3. Furthermore, in FIG. 1, the disc pad 10 is sandwiched, and plurality disc pads 10 may be sandwiched by use of a large heat plate.

The disc pad 10 is sandwiched between the heat plates 21a and 21b provided at the both sides of the friction material 13 and the back plate 1 respectively. The heat plates 21a, 21b require the heat resistance and preferably are metallic, so that especially a steel plate is suitable while other metals may be employed. The heat plate 21a is set to be between 300 and 650° C. The heat plate 21b at the back plate 1 side is set to be between 180 and 350° C. since the back plate 1 is metallic and having high thermal conductivity. By arranging a difference between temperatures of the heat plate 21a at the friction material 13 side and the heat plate 21b at the back plate 1 side, it is possible to make transmitted temperatures roughly the same to both surfaces of the friction material 13, thereby making the entire friction material 13 a uniform temperature over a short period of time.

Furthermore, although the conventional heat treatment temperature is between 200 and 300° C., and, not a heat plate but atmosphere temperature, the present invention is characterized in that the heat transmission by a heat plate is used, and the temperature is set to be high.

The upper limit of the temperature of the heat plate 21a is set at 650° C., because if the temperature of 650° C. is exceeded, large blisters and cracks occur in the finished friction material 13, and the friction material 13 having required wear resistance cannot be attained. The lower limit of the heat plate 21a is 300° C., because if it is below this temperature, there is hardly shortening of heat treatment time. This temperature is preferably 330° C. or higher and 520° C. or below, more preferably, 380° C. or higher and 470° C. or below. If it is 380° C. or higher, it is possible to perform heat-sear process at the same time with heat treatment.

If the temperature of the heat plate 21b at the back plate 1 side is 180° C. or higher, it is possible to obtain the disc pad 10 having preferable shear strength between the friction material and the back plate. If it exceeds 350° C., the adhesive layer is deteriorated by the heat, and the required shear strength between the friction material and the back plate cannot be secured. This temperature is preferably 200° C. or higher and 300° C. or below, more preferably, 220° C. or higher and 250° C. or below.

Generally, when the heat treatment temperature is set high, the curing is developed; however, the binding material included in the friction material 13 is oxidized and deteriorated, and the wear resistance is decreased. In response to this problem, the inventor of the present application has found that by shortening the heat treatment time, it is possible to prevent the binding material from being oxidized and deteriorated, thereby reaching the present invention. Also, the method of the present invention adopts a method of pressing the heat plate rather than increasing the atmosphere temperature by a heating furnace, thereby enabling shorten the heat treatment time.

That is, in the present invention, as discussed above, the disc pad 10 is sandwiched between the heat plate 21a at the friction material 13 side and the heat plate 21b at the back plate 1 side, while keeping the above temperature range, from 2 to 70 minutes, preferably 3 to 50 minutes, more preferably 4 to 15 minutes, thereby completing the heat treatment. If the temperature of the heat plates 21a, 21b is higher, the heat treatment time is shortened. For this time, the thermosetting resin as the binding material completes all curing, and there is no oxidation and/or no deterioration. The method for heating the heat plates 21a, 21b is not limited.

With regard to the pressure at which the heat plates 21a, 21b press, the present invention does not form the disc pad 10 at this pressure. It is enough only if the heat of the heat plates 21a, 21b can be transmitted effectively. Alternatively, it is enough only if deformation of the friction material 13 due to heat can be prevented. From such a viewpoint, in the preferred embodiment of the present invention, it has been found that the pressing force of the heat plates 21a, 21b only has to be 0.1 MPa or higher.

During this heat treatment process, the large amount of gas generates from the friction material 13. In the present invention, a space of only the thickness of the disc pad 10 can be made between the two heat plates 21a and 21b. Therefore, since there is nothing around the friction material 13, gas generated from the friction material 13 is discharged swiftly outside from the circumferential side and does not remain inside to cause swelling or to deform the friction material 13.

If the temperature of the heat plate 21a is set to 380° C. or higher, the heat-sear can be made at the same time with the heat treatment, and accordingly it is possible to skip the heat-sear process arranged as other process after the grinding process in the prior art.

Figure 2:
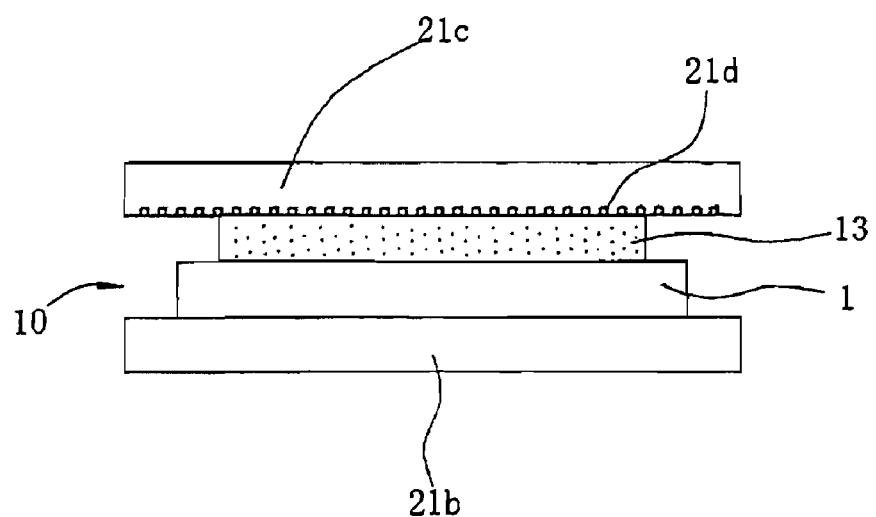
FIG. 2 is a figure of the preferred embodiment, wherein grooves are formed in the heat plate at the friction material side.

FIG. 2 is a cross-section of the preferred embodiment wherein grooves 21d are formed in a heat plate 21c at the friction material 13 side. By arranging the grooves 21d in the heat plate 21c as well, gas can be discharged from the groove 21d as well, and it is possible to obtain the friction material with preferable external appearance.

Figure 3A:
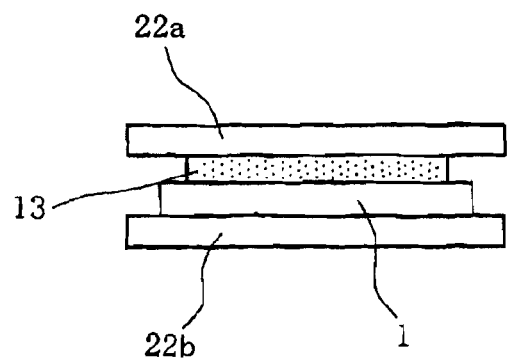
FIGS. 3A, 3B and 3C are figures of an example showing the preferred embodiment wherein plural pairs of the heat plates are used.
Figure 3B:
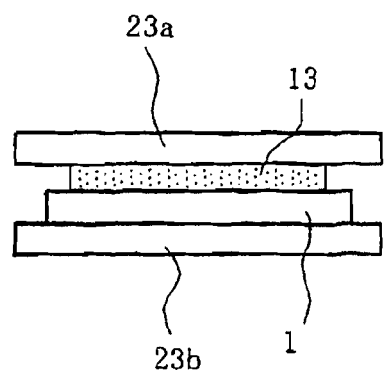
Figure 3C:
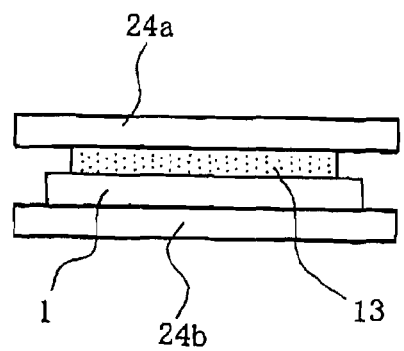
Figure 4A:
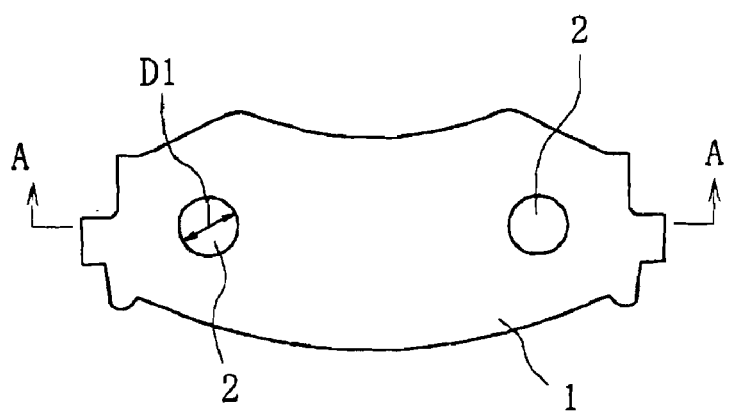
Figure 4B:
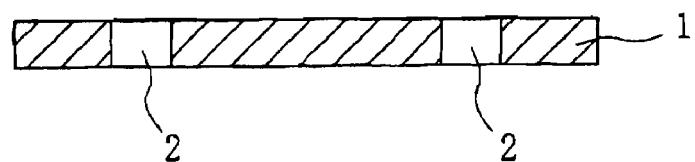
Figure 5A:
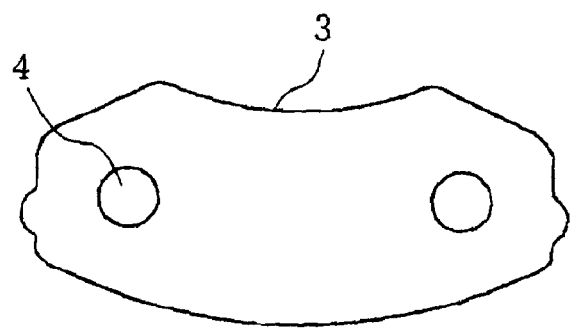
Figure 5B:
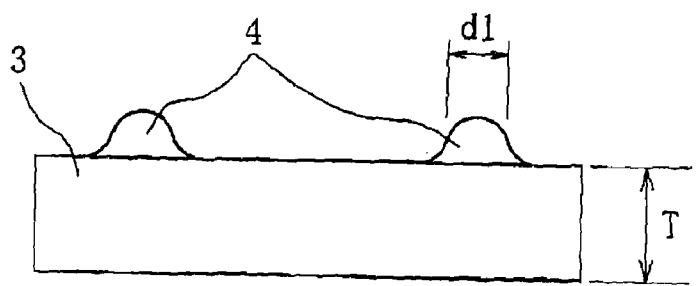

FIGS. 3A, 3B and 3C are figures of the example showing a preferred embodiment wherein plural pairs of heat plates are used. Although in FIG. 1, only one pair of the heat plates 21a, 21b is used, this preferred embodiment uses the first pair of the heat plates 22a and 22b, the second pair of the heat plates 23a, 23b, the third pair of the heat plates 24a, 24b, and so on in total of six pairs. FIGS. 3A, 3B and 3C are shown only three pairs. The number of a pair of the heat plate can be selected by a tact time, and the respective pairs of the heat plate are connected via a belt conveyor not shown in the figures, and it is preferable to perform the heat treatment continuously.

With regard to the manufacturing processes of the friction material, as described previously, the respective processes of the molding, the heat treatment, the painting, and the grinding are indispensable. With regard to the time of each process, the molding is between 1 and 1.5 minutes, the heat treatment is around 8 minutes in the present invention, the painting and the grinding each is around 1 minute. If processes from the molding to the grinding are continued, the heat treatment time becomes the tact time and the tact time does not reach down to 8 minutes or below.

Therefore, plural pairs of heat plates are arranged as in FIG. 3. The temperatures of plural heat plate pairs are all set the same. Then, the heat treatment time in each heat plate pair can be shortened to 1/n (n being the number of heat plate pairs) in the illustrated preferred embodiment, and accordingly, the tact time can be shortened to 1/n of heat treatment time. By increasing or decreasing the number of pairs of the heat plates, the tact time can be adjusted to the required time of previous or following process. Furthermore, the temperatures of the first pair of the heat plates 22a, 22b may be set low, and temperatures of the other pairs of the heat plates may be set stepwise higher as approaching to the sixth pair of heat plates. If the high temperature is set from the beginning, the friction material is heated abruptly, and ultrafine cracks may occur; however, because the temperature is increased gradually from low, minute cracks do not occur, and accordingly, the friction material of the preferable external appearance can be achieved.

If the processes from the molding to the grinding become continuous, another effect is achieved. In the conventional technology, each process is separate, and the friction material waits until it is sent to the next process, so it is cooled down to the room temperature. Therefore, much heating energy and heating time have been required. On the contrary, in the present invention, the molding process, the heat treatment process, the painting process, and the grinding process are performed continuously, and accordingly, the heat at heating in the previous process can be used in the next process. When the temperature at the previous process is too high, cooling to the desired temperature may be performed, and cooling down to the room temperature is not necessary, which enables to save energy for heating and to eliminate heating time, thereby attaining both energy saving and cost reduction.

EXAMPLES

FIG. 7 is a table showing preferred embodiments of the present invention, and FIG. 8 is a table showing comparative examples. In both the preferred embodiments and the comparative examples, the components of the friction material are as shown below.

|  |  |
|---|---|
| Phenolic resin | 20 weight % |
| Steel fiber | 8 weight % |
| Ceramic fiber | 5 weight % |
| Aramid fiber | 5 weight % |
| Artificial graphite | 3 weight % |
| Molybdenum disulfide | 2 weight % |
| Cashew dust | 15 weight % |
| Calcium carbonate | 20 weight % |
| Calcium hydroxide | 2 weight % |
| Barium sulfate | 20 weight % |
| Total | 100 weight % |

In both the preferred embodiments and the comparative examples, the temperature of heated pressed formed product (friction material) just before heat treatment is a normal temperature.

The meanings of symbols in the evaluation column in the tables are as shown below.

Product external appearance: whether there was any blister or crack in the product was judged by visual inspection.

⊚ No Blister, crack

○ No Blister absent, but minute crack present

Δ Minute blister, minute crack present x Large blister, crack present

Wear resistance: Wear amount was measured according to JASO C406.

⊚ Below 1.0 mm

○ 1.0 mm or larger, below 1.2 mm

Δ 1.2 mm or larger, below 1.5 mmx x 1.5 mm or larger

Shear strength: Shear strength between the friction material and the back plate was measured according to JASO C427.

⊚ 5 MPa or higher

○ Below 5 MPa, 4 MPa or higher

Δ Below 4 MPa, 3 MPa or higher x Below 3 MPa

Dimensional error for a product standard: Dimensions of the friction material were measured by a vernier calipers.

⊚ Below ±0.10 mm

○ ±0.10 mm or larger, below 0.12 mm

Δ ±0.12 mm or larger, below 0.15 mm x ±0.15 mm or larger

Initial fade performance: The minimum friction effectiveness μ at the first fade test was measured according to JASO C406.

⊚ μ=0.25 or higher

○ μ=below 0.25, 0.20 or higher

Δ μ=below 0.20, 0.15 or higher x μ=below 0.15

The above preferred embodiments show the friction material fixed to the back plate, and in the case of friction material alone without being fixed to the back plate, temperatures of the heat plates on both sides may be the same.

It is readily apparent that the above-described embodiments have the advantage of wide commercial utility. It should be understood that the specific form of the invention hereinabove described is intended to be representative only, as certain modifications within the scope of these teachings will be apparent to those skilled in the art. Accordingly, reference should be made to the following claims in determining the full scope of the invention.

What is claimed is:

1. A method for manufacturing a friction material including a phenolic resin as a binder, comprising:
    a molding process where a raw material for manufacturing the friction material including a thermosetting resin is pressed and heated in a mold, and a heat treatment process for curing the friction material, wherein said heat treatment process is designed to use a pair of upper and lower non-porous steel heat plates to directly contact to press and heat both upper and lower surfaces of one friction material, while leaving a side surface around the friction material open, a temperature of the heat plate is between 300 and 650° C., and a heat treatment time is between 2 and 70 minutes, thereby maintaining a predetermined wear resistance without causing cracks and blisters in a finished product.

2. The method for manufacturing the friction material according to claim 1, wherein a pressing force for applying the heat plate is 0.1 MPa or higher.

3. The method for manufacturing the friction material according to claim 1, wherein grooves are formed in the heat plate.

4. The method for manufacturing the friction material according to claim 1, wherein plural pairs of the heat plates are arranged in parallel so that said friction materials are sent one after another to be cured.

5. The method for manufacturing the friction material according to claim 4, wherein said plural pairs of the heat plates have different temperatures, and when the friction materials are sent one after another, the temperature increases gradually.

6. The method for manufacturing the friction material according to claim 4, wherein the forming process, the heat treatment process, a painting process, and a grinding process are performed continuously.

7. A method for manufacturing a friction material product including a phenolic resin as a binder, comprising:

a molding process for fixing one friction material onto a back plate, in which a raw material for manufacturing the friction material including a thermosetting resin is superposed onto a back plate, pressed and heated in a mold, and a heat treatment process for curing the friction material, wherein said heat treatment process is designed to use a pair of first and second non-porous steel heat plates provided at the back plate side and the friction material side to directly contact to press and heat lower surface of the back plate and upper surface of the friction material respectively, while leaving a side surface around the friction material open, and a temperature of the first heat plate at the friction material side is between 300 and 650° C., a temperature of the second heat plate at the back plate side is between 180 and 350° C., and a heat treatment time is between 2 and 70 minutes, thereby maintaining a predetermined wear resistance without causing cracks and blisters in a finished product.

8. The method for manufacturing the friction material according to claim 7, wherein the temperature of the heat plate at the friction material side is between 330 and 520° C., the temperature of the heat plate at the back plate side is between 200 and 300° C., and the heat treatment time is between 3 and 50 minutes.

9. The method for manufacturing the friction material product according to claim 7, wherein a pressing force for applying the heat plate is 0.1 MPa or higher.

10. The method for manufacturing the friction material product according to claim 7, wherein grooves are formed in the heat plate.

11. The method for manufacturing the friction material product according to claim 7, wherein plural pairs of the heat plates are arranged in parallel so that said friction material products are sent one after another to be cured.

12. The method for manufacturing the friction material product according to claim 11, wherein said plural pairs of the heat plates have different temperatures, and when the friction material products are sent one after another, the temperature increases gradually.

13. The method for manufacturing the friction material product according to claim 11, wherein the forming process, the heat treatment process, a painting process, and a grinding process are performed continuously.

* * * * *